July 10, 1951  F. R. SIAS  2,560,257
INSTRUMENT DAMPING SYSTEM
Filed Feb. 27, 1946  2 Sheets-Sheet 1
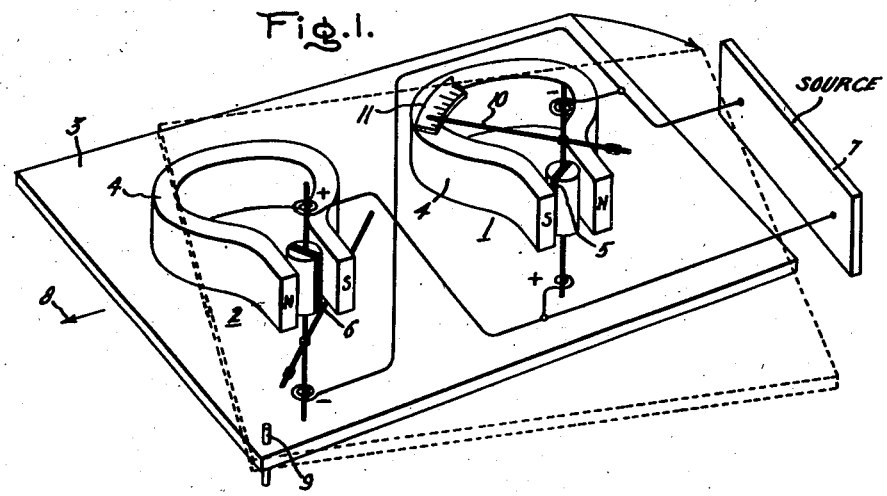
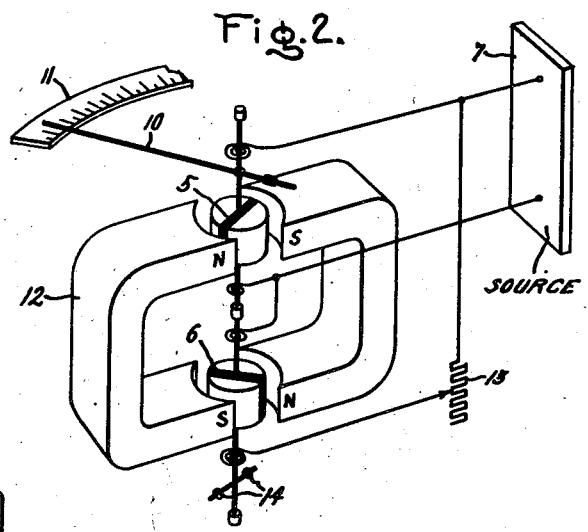
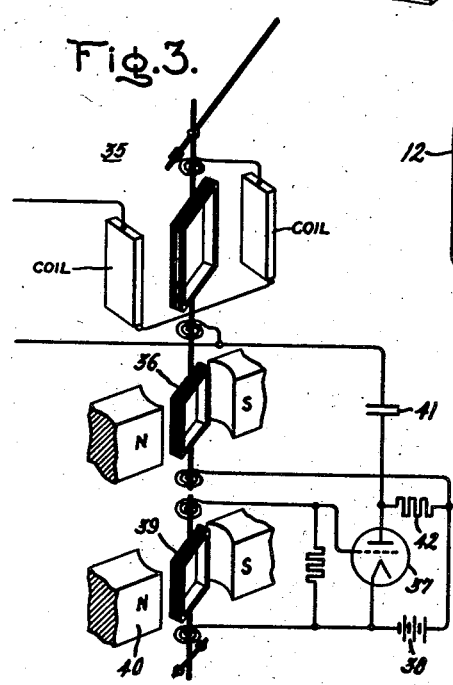
Inventor:
Frederick R. Sias,
by Prowell & Mack
His Attorney.

July 10, 1951  F. R. SIAS  2,560,257
INSTRUMENT DAMPING SYSTEM
Filed Feb. 27, 1946  2 Sheets-Sheet 2
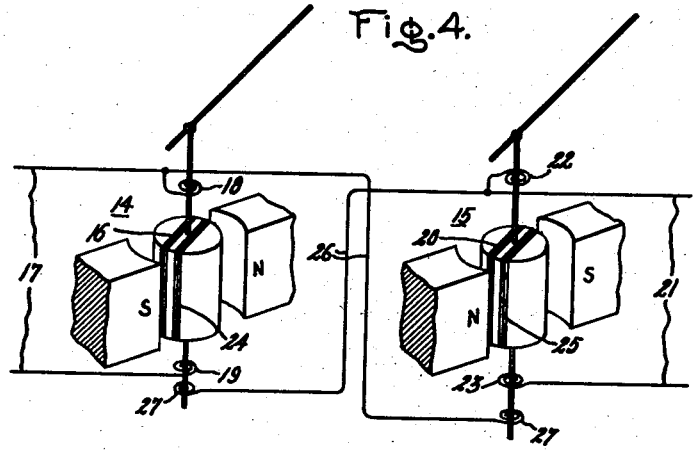
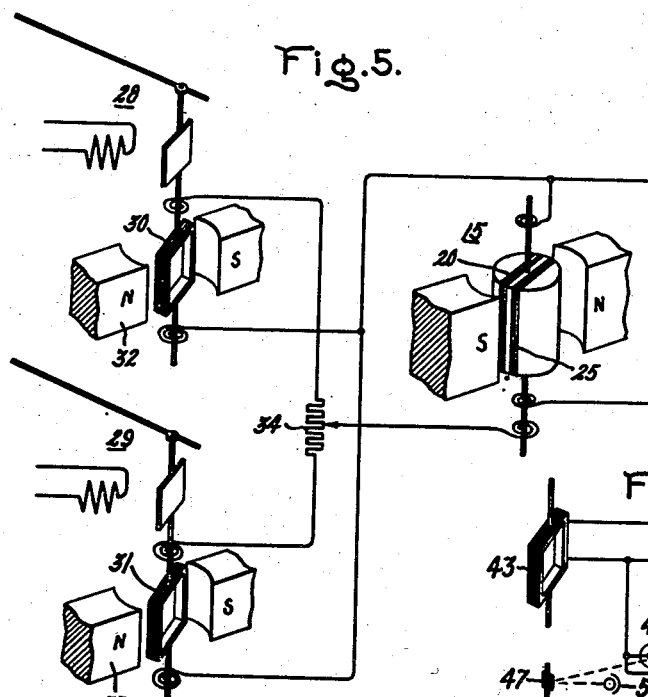
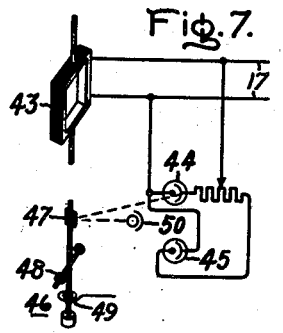
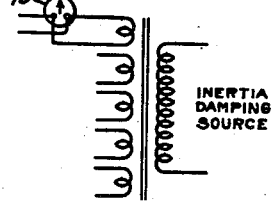
Inventor:
Frederick R. Sias,
by Prowell S. Mark
His Attorney.

Patented July 10, 1951

2,560,257

UNITED STATES PATENT OFFICE 2,560,257

INSTRUMENT DAMPING SYSTEM

Frederick R. Sias, Marblehead, Mass., assignor to General Electric Company, a corporation of New York Application February 27, 1946, Serial No. 650,702

6 Claims. (Cl. 171—95)

My invention relates to a damping system for electrical measuring instruments, and in particular, to means for damping the moving element of such an instrument when the instrument as a whole is subjected to movement having an accelerating or decelerating rotating component about the axis of rotation of the instrument armature. The invention is particularly useful on portable measuring instruments and those used on moving objects such, for example, as airplanes where a turning movement of the instrument is likely to cause the instrument pointer to read too high or too low or to oscillate, due to the inertia of its moving element and the failure of the moving element to exactly follow the rotary movement of the instrument casing.

According to my invention I provide automatic means responsive to any such turning movement of the instrument for introducing into an energizing circuit of the instrument sufficient torque producing energy at the proper time and in the proper direction to oppose any inertia turning movement between the instrument armature and its casing or other stationary parts and without interfering with the performance of the measurement function of the instrument, such that the pointer gives a correct measurement indication on its scale even though the instrument may be subjected to a positive or negative accelerating force about the axis of rotation of its moving element.

The features of my invention which are believed to be novel and patentable will be pointed out in the claims appended hereto. For a better understanding of my invention, reference is made in the following description to the accompanying drawing in which Fig. 1 represents one embodiment of my invention made up of two similar electrical measuring instruments mounted upside down with respect to each other on the same supporting structure and with their armatures interconnected to the measurement source. Fig. 2 represents a preferred embodiment of my invention where the permanent magnet field of the main instrument is also used to supply flux to an auxiliary armature which supplies the damping energy. Fig. 3 represents another embodiment of my invention where the damping energy is supplied through an amplifier to an auxiliary energizing circuit of the main instrument. Figs. 4 and 5 represent different combinations of instruments having auxiliary damping coils connected in opposition, Fig. 6 shows a selective transformer coupling through which damping energy may be supplied, and Fig. 7 shows a damping control instrument which is segregated from the damping energy supply source and from the instrument which is damped by a photoelectric damping energy supply source and light beam control system.

Fig. 1 is a schematic representation of two electric measuring instruments 1 and 2 mounted on the same support 3. For the sake of clearness, only the main parts of the instruments have been shown but it is assumed that the instruments will be mounted in suitable casings or a case, so that the stator parts 4 are ordinarily immovable with respect to the common support 3, and that the armature coils 5 and 6 are freely rotatively mounted in suitable bearings. The two instruments are assumed to be identical. However, instrument 2 is mounted upside down with respect to instrument 1 on the support 3 with their axes of rotation parallel. The instruments are represented as of the permanent magnet field type with moving coil armatures 5 and 6. The armature coils are similarly connected in parallel; that is with the positive terminals together and the negative terminals together; to a source of supply 7 which we may assume to be a photoelectric cell generating a voltage proportional to the amount of light to which it is exposed.

It is further assumed that the moving elements of the instruments are statically balanced such that with sudden movement of support 3 in a straight sidewise direction as in the direction of arrow 8, there will be no turning movement tendency of either armature.

With light falling on cell 7 both instruments will produce similar scale deflections but because one is upside down, the pointer of instrument 1 will deflect clockwise to the right and the pointer of instrument 2 will deflect counterclockwise to the left when an increasing voltage is applied. Assume now that the support 3 with the instruments thereon be given a sudden turning movement so as to produce a turning component about the axis of rotation of the instruments, as for example, turning the base about a pivot at point 9 to the right to the position indicated in dotted lines. Since the armature elements 5 and 6 have some inertia, they will tend to stand still. Armature 5 of instrument 1 being farthest from the pivot 9 will move farther and faster than armature 6 of instrument 2 but since the armatures are statically balanced, the rectilinear or sidewise component of the movement, although different in the two instruments, will have no turning effect on the armatures. However each armature has equal turning movement components corresponding to the angle through which the support 3 is turned in a plane at right angles to the axis of rotation of the instrument armatures. Hence, both instrument armatures will tend to turn counterclockwise relative to their stator elements, by an equal amount, or stated in another way, the armatures will tend to remain at rest while their stator elements are being turned clockwise. If such turning of the armatures is permitted, it will produce momentary error in the measurement indications. For instance, in instrument 1 the pointer 10 thereof would tend to move down scale or counterclockwise relative to its casing and scale 11. This is what usually happens in the ordinary portable measuring instrument or with instruments mounted on moving structures such as airplanes, when the casing is given a turning component about the axis of rotation of the instrument armature. Take for example a photometer such as is disclosed in United States Letters Patent No. 2,346,529, which is ordinarily carried in a person's hand when being used to measure light values; every time the person holding the meter turns his hand or body so as to give the meter the slightest turning movement either way about its pivoted armature axis, an erroneous meter indication results, making it necessary for the person to be more careful and requiring more time than necessary to obtain an accurate measurement indication. On an airplane where it is more difficult to control or to even detect such rotary movement, instrument indications which are in error by a variable amount from this cause are likely to occur. Such errors may be termed inertia deflection errors.

My invention concerns damping means for eliminating such errors and which in a somewhat crude but nevertheless very effective form is embodied in Fig. 1. When the instrument armature 5 turns in its field due to its inertia and the turning of the field as above described, the amount of field flux threading its armature changes and a corresponding voltage is generated in the armature. An equal voltage is simultaneously generated in the similar armature coil 6 of instrument 2. In the circuit which couples these two armatures together, these voltages are in series and hence, add together, thus causing currents to flow which produce torque tending to oppose the armature rotations which produce them, and as a result, the armature rotations are very greatly reduced over that which would occur without such coupling. This damping action occurs whether the voltage being measured is high or low at any portion of the instrument scale range and would occur if the source of supply 7 be disconnected entirely so long as the coupling between the instruments is maintained; and hence, it does not interfere with the instrument measurement function. The action described occurs during acceleration of the turning movement and again during deceleration, and the same action occurs if the turning movement be in the opposite direction from that first assumed. The damping voltages will both reverse on reversal of the direction of turning or when changing from acceleration to deceleration. Hence, the action occurs in response to any movement which has a turning component of acceleration about the axis of rotation of the instrument used, whether the acceleration be positive or negative.

There is another form of damping generally desirable and usually present in measuring instruments for preventing the moving elements from swinging too far when there is a sudden change in the quantity to be measured, which form of damping may be termed measurement deflection damping.

The voltages generated in the indicating and damping armatures during a measurement deflection, instead of adding together as in the case of inertia damping, will be opposed, and as a result, no damping currents from this cause will flow between the armatures. Therefore, the normal damping characteristics of the instruments will remain unchanged and they may be critically damped or otherwise as desired.

Inertia damping action also occurs if the instruments be connected in series to the source of supply or in series in a closed circuit. Instead of connecting the instruments in parallel and turning one over, they would be connected in series and both left the same side up. In this case, the currents generated because of armature rotation caused either by a measurement deflection or deflection due to rotation of the instrument base will be in the same direction. The amount of damping will depend on the total circuit resistance and will be the same for both types of damping instead of being independent as in the case of the parallel connection. In Fig. 1, it is apparent that the two instruments will draw twice as much current from the source of measurement supply as would a single instrument of the same design. In Fig. 1 the instrument 1 may be considered the measuring instrument which is read and 2 the instrument which supplies the damping voltage for instrument 1 to make it possible to obtain more accurate readings with less trouble when the combination is subject to turning acceleration movements than would otherwise be possible.

In cases where dual indication of some quantity is desired, as for instance, in the case of an airplane where both the pilot and flight engineer must observe a given quantity, both the indicating and damping elements may be provided with scales and pointers and mounted in different locations in the airplane structure as long as the requirements, that they be subject to the same rotational acceleration forces and that the shafts are parallel, are maintained. In the sense that parallel is used in this application, it includes co-axial axis of rotation.

Fig. 2 represents an improved embodiment of my invention. In Fig. 2 a single permanent magnet field assembly 12 is employed for both the measuring instrument armature 5 and the damping armature 6, and the two armatures have a common axis of rotation which helps in keeping the size of the combination small. The cup shown between the two armature shafts contains jewel bearings for both. The two armatures are connected in parallel as before and it will be apparent from the connections of the armatures that additive voltages will be generated in response to acceleration turning movements which tend to turn the armatures. In Fig. 2 the circuit of armature coil 6 is made appreciably higher in resistance than that of armature coil 5 as by a resistance 13, so that armature coil 6 draws only a small fraction of the current drawn by measurement coil 5 from the measurement source, thus increasing the measurement sensitivity of the combination to that approaching a normal instrument without the damping feature of my invention. Also the inertia of the moving element of the damping armature 6 is appreciably increased in comparison to that of the measuring instrument armature coil 5 as by adjustable weights 14 on the shaft of armature 6. By this expedient it is feasible to have the armature coil 6 supply enough voltage to hold armature coil 5 still when the combination is subjected to acceleration turning movements. In fact, coil 6 can supply more than enough voltage for this purpose and actually cause the armature coil 5 to move up scale in the same direction as that of the acceleration turning movement. The correct amount of inertia for armature 6 to supply the correct voltage and torque to hold armature 5 still under acceleration turning movements may be adjusted by adjusting the weights 14. These may comprise nuts threaded on a crossarm secured to the shaft of armature 6. A further finer adjustment for the same purpose may be made by adjusting resistance 13. Increasing the resistance results in a greater turning movement of armature 6 in response to a given turning force and inertia adjustment and but slight change in the current supplied to coil 5. The resistance represented at 13 may of course be included in coil 6, which may also have an increased number of turns, reducing the amount of swing which this armature must have to generate the required damping current. Thus Fig. 2 represents an embodiment of the invention with exact compensation for the inertia error of the measuring instrument, with only minor reduction in overall sensitivity.

Where a number of indicating instruments are grouped together as on an aircraft instrument panel with their rotational axes parallel, it is oftentimes practicable to provide damping coils on different instruments and connect them. with advantage, as represented in Fig. 4. Here 14 and 15 represent two measuring instruments of the moving coil permanent magnet field type. The usual armature coil 16 of instrument 14 is connected to a measuring circuit 17 through spirals 18 and 19, and the usual armature coil 20 of instrument 15 is connected to a measuring circuit 21 through spirals 22 and 23. On the armature coil support of each instrument there is an additional auxiliary inertia damping coil designated 24 and 25 connected in series through coupling wires 26. One of the regular spirals of each instrument as 18 and 22 may be used in making these coupling connections so that only one additional spiral per instrument indicated at 27 need be used.

In general, it will be best to couple the instruments which are nearest alike in inertia effect together. That is, if there are four instruments, two with high inertia and two with low inertia, the two with low inertia may be coupled together and the two with the high inertia may be coupled together as above described. The sensitivity and measuring functions of the instruments are not interfered with, but erroneous indications due to rotational accelerating forces having components about the armature axis will be very effectively reduced. To assist in matching inertia voltages, the instrument of a pair which has the lowest inertia may have a correspondingly greater number of turns in its auxiliary coil. It is also always possible to match up the inertia effects by adding small weights to the moving system of one instrument as represented at 14 in Fig. 2.

An instrument having high inertia may have an inertia damping coil connected in additive voltage relation with parallel connected damping coils on two low inertia instruments as represented in Fig. 5. Here instrument 15 may be a direct current moving coil permanent magnet field instrument as in Fig. 4, assumed to have a heavy inertia moving element. Instruments 28 and 29 are of the A.-C. moving iron vane type and are provided with inertia dynamometers or inertia damping coils 30 and 31 on their shaft extensions which move in permanent magnet fields 32 and 33. The damping coils 30 and 31 are connected in additive voltage relation with inertia damping coil 25 of instrument 15. Instruments 28 and 29 are assumed to have low inertia as compared to instrument 15 such that the latter can supply sufficient inertia damping energy for both of the low inertia instruments. The proper division of the energy in the two iron vane instrument inertia damping circuits may be had by an adjustable resistance connection at 34.

The inertia damping of my invention will generally provide some measurement deflection damping, although it will not be as forceful as the inertia damping. For instance, in Fig. 4, if there is a sudden movement of the pointer of instrument 14 upscale due to an increase in the measurement voltage of source 17, an electromotive force will be generated in auxiliary coil 24, causing some current to flow in the damping circuit including auxiliary coil 25 of instrument 15, thus using up energy and damping the initiating movement. This may also cause the pointer of instrument 15 to move temporarily from a correct measurement position. However, the damping electric energy here involved is only half of that which would be produced by an inertia movement of the same amount in both armatures and the change in indication is often quite slow. Hence, the movement produced in instrument 15 is comparatively small. If the armature supporting coil frames be made of aluminum or other suitable conducting material, the instruments will be otherwise provided with effective instrument deflection damping. so as to still further reduce the tendency of one instrument to deflect in response to a sudden measurement deflection of the other.

In an arrangement of the character shown in Fig. 4 where one instrument may have an upscale deflection and the other a downscale deflection, it is desirable to employ damping fields which are fairly uniformly effective over the entire deflection range so that the inertia damping will be uniform and balanced in both instruments regardless of their relative deflections.

In Fig. 3 there is shown an embodiment of the invention where the inertia damping energy for an electrodynamometer type instrument 35 is supplied to an inertia damping coil 36 on its shafts through an impedance such as a condenser 41 from a vacuum tube amplifier 37 and a direct current source 38. The amount of damping current is controlled by an inertia damping coil 39 moving in a permanent magnet field 40. Coil 39 is connected across the grid cathode electrodes of the tube 37 so as to vary the bias on the tube and the current therethrough. The tube is adjusted to pass current continuously through a resistance 42 so as to maintain a constant D.-C. voltage across the coil 36 and condenser 41 in series. When there is no movement of coil 39, no current flows in coil 36. When coil 39 does turn, it increases or decreases the current flow through tube 37 in proportion to the rate of turning and causes current to flow through coil 36 in one direction or the other in an amount and direction sufficient to prevent the instrument 35 from rotation due to inertia turning forces. Thus in this modification the connection between the inertia influenced coils is through an amplifier.

In some cases it may be desirable to supply the inertia damping energy to the instrument through a transformer or condenser coupling, since with such forms of coupling the damping energy in the form of pulsating direct current will be transferred through the coupling but the energy of a steady direct measuring current will not. This type of selective coupling is indicated in Fig. 6, and may be desirable where a large number of instruments such as represented at 43 are mounted on a common support and require inertia damping.

Fig. 7 represents an inertia damping supply system in which there is no electrical load on the damping control instrument and no energy transferring coupling between the damping control instrument and the instrument which is damped. In this figure 43 represents the instrument to be supplied with inertia damping energy. The energy for this purpose is supplied by photoelectric cells 44 and 45. The inertia damping control instrument is represented at 46 and consists of a shaft having its axis of rotation parallel with the instrument 43 and assumed to be mounted on the same supporting structure. The shaft carries a mirror 47, adjustable inertia control weights 48, and a spring bias 49. A light source 50 directs light to the mirror 47 and to a neutral position between the photo cells 44 and 45 when there are no inertia accelerating and decelerating forces. The spring 49 is adjusted for this purpose. When the system is subjected to acceleration and deceleration forces about the axis of rotation, the mirror reflects light to one or the other of the photo cells 44 and 45, and thus, electric energy in the form of direct current is supplied to the instrument 43 by the photoelectric cells. The direction and amount of such current are such as effectively to prevent inertia damping errors in the instrument 43. It will be evident that in this system no electrical energy is furnished by the damping instrument 46, and no direct current will flow from the measuring circuit 17 through the photoelectric cell circuit. Only one photoelectric cell is active at any particular time and when active, it determines the direction of current flow therethrough. Where necessary, an amplifier may be included between the photoelectric cells and the instrument 43.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A measuring instrument having a rotary moving element of appreciable inertia adapted to be rotatively deflected to different positions in response to a measurement, said instrument being subject to rotational acceleration forces having a component about the axis of rotation of its moving element, a coil on said moving element, a relatively stationary unidirectional field in which said coil may rotate, and means for supplying to said coil electromotive forces of such timing, direction, and magnitude as to minimize inertia deflection errors to which said instrument would otherwise be subjected, said means including a dynamometer device with its stationary part secured in fixed relation to said instrument and having a rotary movable element possessing inertia which is rotatable independently of the movable element of said instrument and with its axis of rotation maintained parallel to that of said measuring instrument and having a winding electrically connected in parallel relation with said coil with like polarity terminals of said winding and coil connected together.

2. An electrical measuring instrument having a rotary moving element adapted to be rotatively deflected to different positions in response to measurements, a coil on said moving element, a relatively stationary unidirectional field in which said coil rotates, a second instrument having a coil rotatively mounted for rotation in a relatively stationary unidirectional field, said two instruments having a common supporting base with their moving coils rotating mechanically independently on parallel axes, circuit connections between said coils connecting like polarity terminals of said coils together whereby the voltages generated in said coils due to rotation of said coils in their fields in the same direction mutually tend to prevent such rotation whereby inertia deflection errors in the first mentioned electrical measuring instrument are minimized by the second instrument.

3. An electrical measuring instrument having a unidirectional field and an armature member including a measuring current coil rotatively mounted in said field, a second instrument having a unidirectional field and an armature member including a current coil rotatively mounted in the last-mentioned field, the armature members of said instruments being mechanically free to rotate relative to each other, the field members of said instruments having a common support on which the axes of rotation of the two instrument armatures are mounted parallel to each, means for connecting said coils to a measuring circuit and in parallel with each other with terminals of said coils of like polarity connected together whereby the voltages generated therein by rotation of the coils in the same direction in their fields are in additive relation, the circuit resistance of the coil of the second-mentioned instrument being high relative to that of the first-mentioned coil so that the higher resistance circuit will take less current from the measuring circuit as compared to the measuring instrument coil, said second-mentioned instrument serving to substantially prevent inertia deflection errors in the measuring instrument.

4. An electrical measuring instrument combination comprising coaxial rotatively mounted armature coil members and common means producing unidirectional fields in which said armature members are adapted to rotate, said armature members being mechanically free to rotate relative to each other and each having a coil, means for interconnecting said coils with like polarity terminals together whereby the voltages generated therein due to inertia rotation of said coils in the same direction in their fields produces a current flow in both coils which opposes such rotation of the coils.

5. In combination, a plurality of deflection type measuring instruments each having a rotary member provided with a coil and a stationary unidirectional field producing member in which the corresponding coil rotates, means for supporting said instruments such that the axes of rotation of their rotary members are parallel, said rotary members being mechanically free to rotate relative to each other, and electrical energy transferring interconnections between said coils connecting terminals of like polarity together thereby permitting the transfer of electrical energy between them of such character as to minimize the inertia deflection errors of all of said instruments.

6. An electrical measuring instrument comprising an energizing coil member and a permanent magnetic field member for producing an operating flux through the coil member, one of said members being stationary and the other rotatable, an instrument for providing inertia damping current to the coil member of said measuring instrument, said last-mentioned instrument comprising a generating coil member and a permanent magnet field member for producing an operating flux through the generating coil member one of the members of the damping instrument being stationary and fixed to the stationary member of the electrical measuring instrument and the other member of the damping instrument being rotatable both with respect to said stationary members and with respect to the rotatable member of the measuring instrument said rotatable members having parallel axes of rotation, and electrical connections between the coil members of said measuring and damping instruments connecting terminals of like polarity of said coils together such as to produce mutual opposition to rotation of said rotary elements relative to their stationary elements in the same direction, the inertia of the moving element of said damping instrument being sufficiently greater than the inertia of the rotary member of the measuring instrument as substantially to prevent the occurrence of inertia damping errors in such measuring instrument such as would otherwise be caused by a sudden rotary movement of its stationary member about the axis of rotation of its rotary member.

FREDERICK R. SIAS.

REFERENCES CITED

The following references are of record in the file of this patent:

UNITED STATES PATENTS

| Number | Name | Date |
|---|---|---|
| 698,679 | Duncan | Apr. 29, 1902 |
| 2,351,353 | McCarty | June 13, 1944 |
| 2,351,079 | Strobel | June 13, 1944 |
| 2,356,617 | Rich | Aug. 22, 1944 |
| 2,427,571 | Pattee | Sept. 16, 1947 |